H. C. & W. W. Ketcham. Dinner Pail & Lantern.

No. 120,442.

Patented Oct. 31, 1871.

Witnesses:
Gustave Dieterich
H. C. Smith

Inventors:
H. C. Ketcham
W. W. Ketcham
Per
Attorneys.

UNITED STATES PATENT OFFICE.

HORACE C. KETCHAM AND WILLIE W. KETCHAM, OF NEWARK, NEW JERSEY.

IMPROVEMENT IN DINNER-PAILS.

Specification forming part of Letters Patent No. 120,442, dated October 31, 1871.

*To all whom it may concern:*

Be it known that we, HORACE C. KETCHAM and WILLIE W. KETCHAM, of Newark, in the county of Essex and State of New Jersey, have invented a new and Combined Dinner-Pail and Lantern; and we do hereby declare that the following is a full, clear, and exact description thereof, which will enable others skilled in the art to make and use the same, reference being had to the accompanying drawing forming part of this specification, in which—

Figure 1:
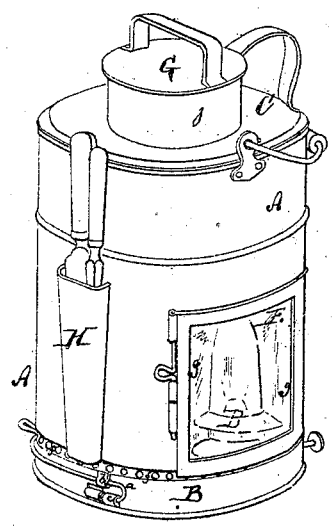
Figure 2:
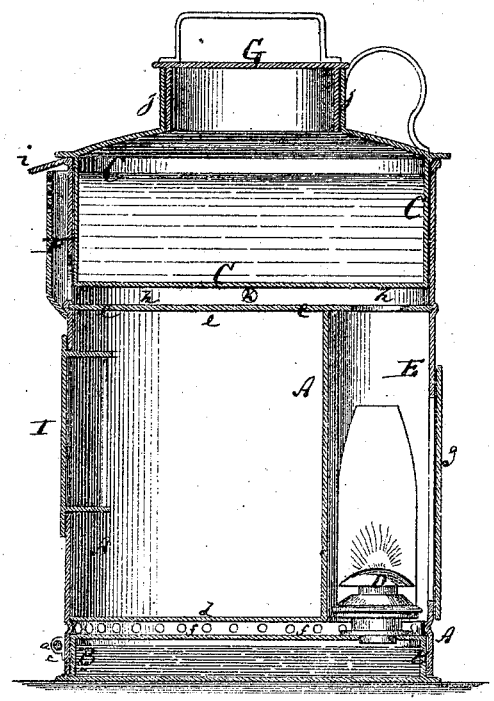
Figure 3:
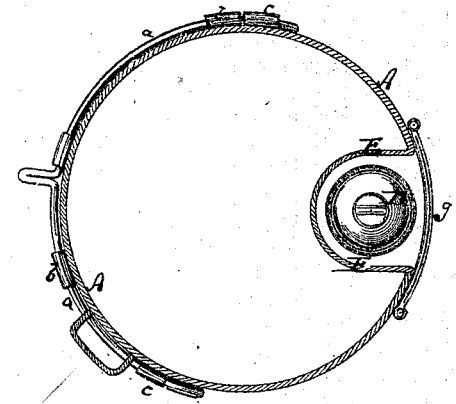

Figure 1 is a perspective view of our combined dinner-pail and lantern. Fig. 2 is a vertical central section of the same. Fig. 3 is a horizontal section of the same.

Similar letters of reference indicate corresponding parts.

This invention relates to a new dinner-pail which is provided with a lamp whereby its contents can be heated, and with a transparent side or door through which the rays of light from the lamp can be projected. Our invention consists in improving the construction of dinner-pails, as hereinafter fully described and subsequently pointed out in the claims.

A in the drawing represents the cylindrical body or lower part of the dinner-pail. B is the lower oil-reservoir, constituting its bottom; and C, the upper removable dish or vessel. The reservoir B is flat, cylindrical, and supports, near one side, the burner D, of suitable construction. The body A laps over the edge of the reservoir, embracing it, as shown. A curved bolt, $a$, supported in ears $b\ b$ that project from the lower part of the body A, can be moved into projecting loops $c$ of the reservoir B, or drawn out of the same to secure the lamp to or detach it from the body A. The body A contains the horizontal partitions $d$ and $e$, the former but a short distance above the reservoir, the latter a short distance under the bottom of the dish C. A tube, E, extends vertically through the vessel A and traverses both partitions $d$ and $e$, being open at both ends. The lamp-burner D enters the tube E, as shown. Air is brought to the flame for aiding combustion through apertures $f\ f$ in the sides of the vessel A, below the partitions $d$. The tube, or rather flue E, is arranged within A, close to one side, which is made in form of a hinged door, $g$, containing a panel of isinglass or other transparent material. Through this door the light of the lamp can be seen, so that the apparatus can be used as a lantern. The products of combustion from the lamp pass up in the flue E and enter the space $h$ between the bottom of C and the plate $e$. They there serve to heat the contents of C as they are spread under the entire dish, and finally escape through a flue, F, affixed to the side of A. The gases can be still more spread by having escape-apertures $k$ at the sides of the space $h$. The flue F is perforated at the side, and has a protective covering or hood, $i$, which keeps out the rain-water. The cover G of the dish C enters a projecting mouth or flange, $j$, as shown. H is a pocket, affixed to the side of A for receiving a knife and fork. I is a door leading to the interior of A, between the plates $d$ and $e$, to reach the contents.

Having thus described our invention, we claim as new and desire to secure by Letters Patent—

1. The curved bolt $a$ and loops $b\ c$ on body A, combined with the oil-reservoir B to render it removable, as set forth.

2. The side flue E and passage $h$, when combined with the discharge-flue F, as and for the purpose specified.

HORACE C. KETCHAM.
WILLIE W. KETCHAM.

Witnesses:
   WM. ERASTUS REID,
   GEO. WALKER JENKINS.

(136)